(12) United States Patent
Otani

(10) Patent No.: US 12,247,995 B2
(45) Date of Patent: Mar. 11, 2025

(54) SENSOR MODULE AND MEASUREMENT SYSTEM

(71) Applicant: SEIKO EPSON CORPORATION, Tokyo (JP)

(72) Inventor: Fumikazu Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/708,263

(22) Filed: Mar. 30, 2022

(65) Prior Publication Data

US 2022/0317146 A1 Oct. 6, 2022

(30) Foreign Application Priority Data

Apr. 1, 2021 (JP) ................................ 2021-062997

(51) Int. Cl.
| | |
|---|---|
| *G01P 15/08* | (2006.01) |
| *G01C 19/5776* | (2012.01) |
| *G01C 21/16* | (2006.01) |
| *G01P 3/00* | (2006.01) |
| *G01P 15/18* | (2013.01) |

(52) U.S. Cl.
CPC .......... *G01P 15/08* (2013.01); *G01C 19/5776* (2013.01); *G01C 21/16* (2013.01); *G01P 3/00* (2013.01); *G01P 15/18* (2013.01)

(58) Field of Classification Search
CPC . G01P 15/18; G01P 15/08; G01P 3/00; G01C 19/5776; G01C 21/16
See application file for complete search history.

(56) References Cited

U.S. PATENT DOCUMENTS

| | | | |
|---|---|---|---|
| 8,573,982 B1* | 11/2013 | Chuang .............. | A63B 69/0028 434/247 |
| 9,599,634 B2* | 3/2017 | Jacobson ............... | G01C 25/00 |
| 12,007,407 B2* | 6/2024 | Otani ...................... | G01P 15/08 |
| 2006/0185432 A1* | 8/2006 | Weinberg .................. | G01P 3/44 73/510 |
| 2006/0250257 A1* | 11/2006 | Reynolds ............. | G01C 21/166 340/601 |
| 2007/0010936 A1* | 1/2007 | Nordmark .......... | G01C 21/1656 701/472 |
| 2012/0017676 A1* | 1/2012 | Schmid .................. | G01C 19/56 73/504.02 |
| 2012/0253738 A1* | 10/2012 | Nasiri ..................... | G01P 1/023 702/141 |

(Continued)

FOREIGN PATENT DOCUMENTS

| | | |
|---|---|---|
| JP | 2014-178952 | 9/2014 |
| JP | 2016-212577 | 12/2016 |

(Continued)

*Primary Examiner* — Helen C Kwok
(74) *Attorney, Agent, or Firm* — Rankin, Hill & Clark LLP

(57) ABSTRACT

The sensor module includes a plurality of inertial measurement units having an angular velocity sensor device, an acceleration sensor device, and a signal processing circuit configured to process an output signal from the angular velocity sensor device and the acceleration sensor device, and an oscillation circuit configured to generate a synchronizing clock which synchronizes the plurality of inertial measurement units. Further, the oscillation circuit is provided to one of the inertial measurement units.

7 Claims, 6 Drawing Sheets

(56) References Cited

U.S. PATENT DOCUMENTS

| | | | | |
|---|---|---|---|---|
| 2012/0296601 | A1* | 11/2012 | Eatwell | G01P 15/18 |
| | | | | 702/141 |
| 2013/0340524 | A1* | 12/2013 | Maeda | G01P 15/125 |
| | | | | 73/514.02 |
| 2015/0276793 | A1* | 10/2015 | Takenaka | A61B 5/1121 |
| | | | | 73/504.03 |
| 2016/0003863 | A1* | 1/2016 | Chau | G01P 15/00 |
| | | | | 73/152.46 |
| 2016/0036544 | A1 | 2/2016 | Katayama et al. | |
| 2016/0145096 | A1* | 5/2016 | Allegato | B81B 7/02 |
| | | | | 257/419 |
| 2016/0269011 | A1* | 9/2016 | Uehara | G01P 15/09 |
| 2016/0330278 | A1 | 11/2016 | Katayama et al. | |
| 2018/0274925 | A1* | 9/2018 | Sudo | B60W 40/10 |
| 2019/0277655 | A1* | 9/2019 | Masad | G01C 21/183 |
| 2019/0283732 | A1 | 9/2019 | Otani et al. | |
| 2019/0285663 | A1* | 9/2019 | Chino | G01P 15/18 |
| 2020/0201359 | A1* | 6/2020 | Burghardt | G01C 21/1654 |
| 2020/0241033 | A1* | 7/2020 | Altintas | G01D 3/08 |
| 2021/0270635 | A1* | 9/2021 | Takeda | G01D 1/04 |
| 2021/0270686 | A1* | 9/2021 | Rogers | G01P 15/0891 |
| 2023/0353876 | A1* | 11/2023 | Yamashita | H04N 25/70 |

FOREIGN PATENT DOCUMENTS

| | | |
|---|---|---|
| JP | 2019-060689 | 4/2019 |
| JP | 2019-163955 | 9/2019 |
| JP | 2019-164443 | 9/2019 |

* cited by examiner

SENSOR MODULE AND MEASUREMENT SYSTEM

The present application is based on, and claims priority from JP Application Serial Number 2021-062997, filed Apr. 1, 2021, the disclosure of which is hereby incorporated by reference herein in its entirety.

BACKGROUND

1. Technical Field

The present disclosure relates to a sensor module and a measurement system.

2. Related Art

For example, a physical quantity detection device described in JP-A-2019-60689 has a plurality of X-axis acceleration sensors, a plurality of Y-axis acceleration sensors, and a plurality of Z-axis acceleration sensors. As described above, by installing the plurality of X-axis acceleration sensors, the plurality of Y-axis acceleration sensors, and the plurality of Z-axis acceleration sensors, there is achieved an improvement in S/N ratio of an X-axis acceleration signal, a Y-axis acceleration signal, and a Z-axis acceleration signal.

However, when detection signal acquisition timing is shifted between the X-axis acceleration sensors, there is a possibility that the detection accuracy becomes rather worse by contrast. The same applies to the Y-axis acceleration sensors and the Z-axis acceleration sensors.

SUMMARY

A sensor module according to the present disclosure includes a plurality of inertial measurement units having an angular velocity sensor device, an acceleration sensor device, and a signal processing circuit configured to process an output signal from the angular velocity sensor device and the acceleration sensor device, and an oscillation circuit configured to generate a synchronizing clock which synchronizes the plurality of inertial measurement units.

A measurement system according to the present disclosure includes the sensor module described above, and a host device electrically coupled to the sensor module.

DESCRIPTION OF EXEMPLARY EMBODIMENTS

A sensor module and a measurement system according to the present disclosure will hereinafter be described in detail based on some embodiments shown in the accompanying drawings.

First Embodiment

Figure 1:
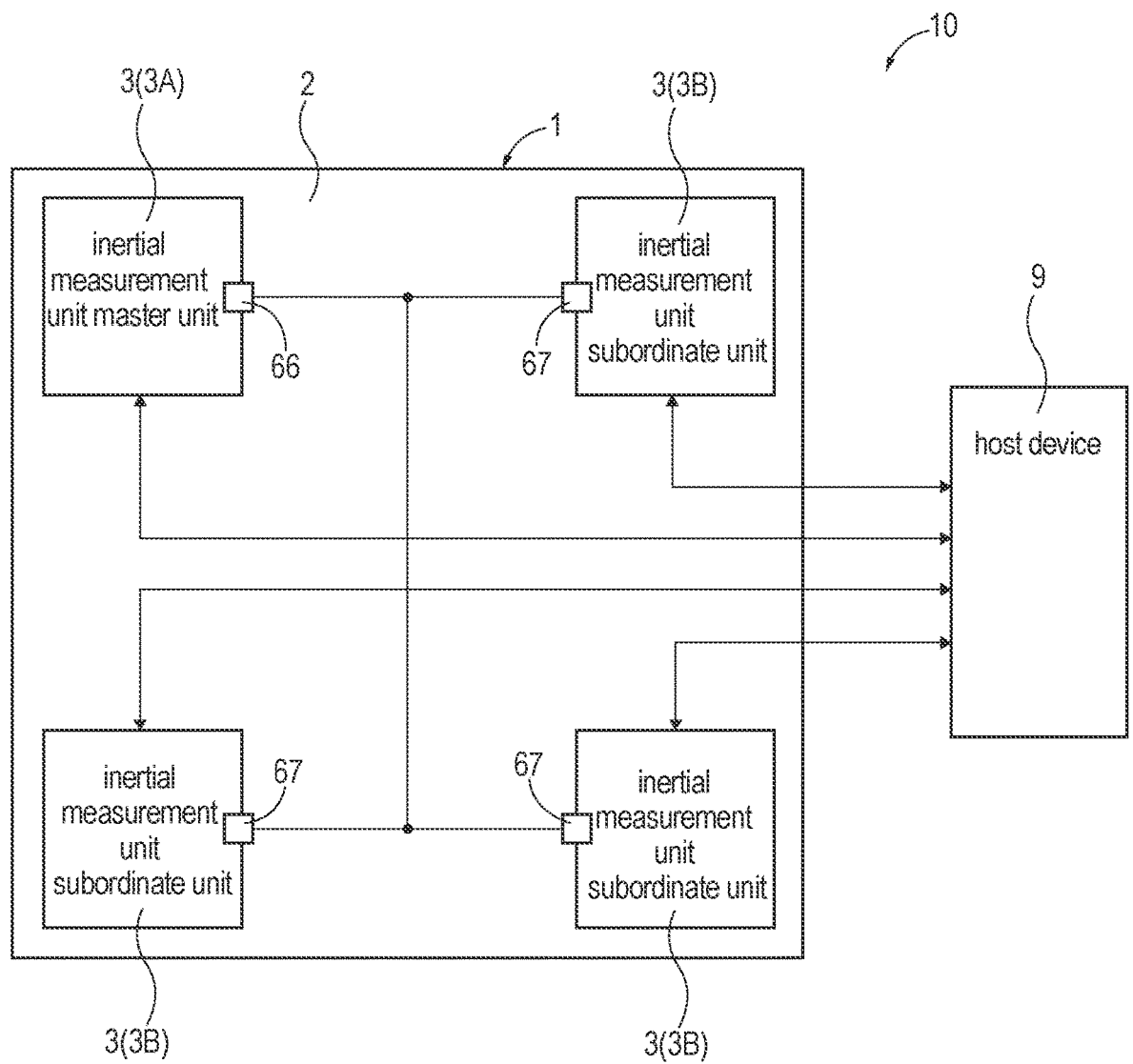
FIG. 1 is a block diagram showing an overall configuration of a measurement system according to a first embodiment of the present disclosure.
Figure 2:
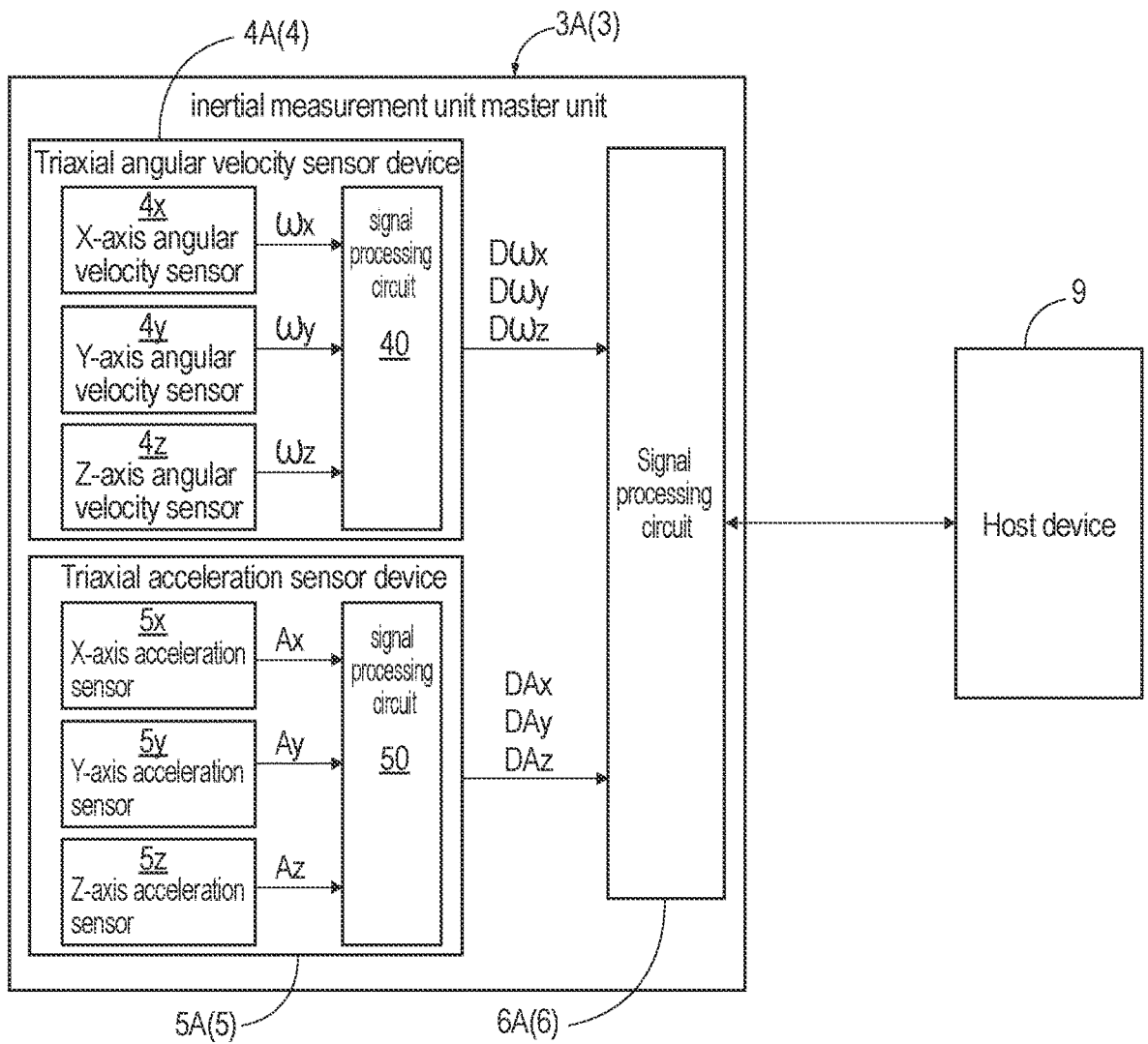
FIG. 2 is a block diagram showing an inertial measurement unit as a master unit.
Figure 3:
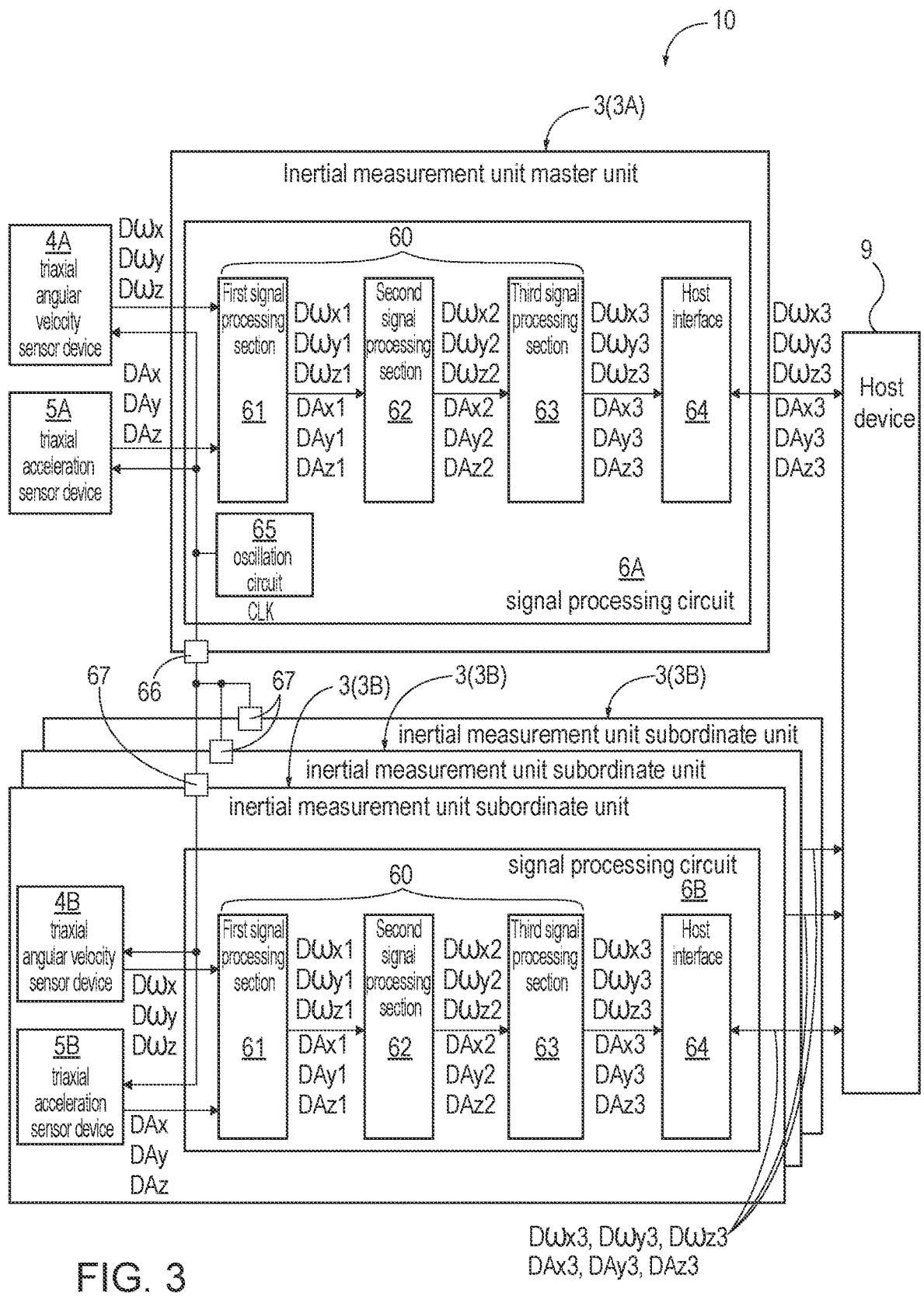
FIG. 3 is a block diagram showing a circuit configuration of a signal processing circuit.

FIG. 1 is a block diagram showing an overall configuration of a measurement system according to a first embodiment of the present disclosure. FIG. 2 is a block diagram showing an inertial measurement unit as a master unit. FIG. 3 is a block diagram showing a circuit configuration of a signal processing circuit.

As shown in FIG. 1, a measurement system 10 has a sensor module 1, and a host device 9 electrically coupled to the sensor module 1. Further, the sensor module 1 has a mounting board 2, four inertial measurement units 3 (IMU) mounted on the mounting board 2.

Further, as shown in FIG. 1, the four inertial measurement units 3 are arranged on the mounting board 2 at a distance from each other. In particular, in the present embodiment, the four inertial measurement units 3 are arranged at a distance as long as possible from each other. Thus, it is possible to suppress interference between the inertial measurement units 3, and thus, it is possible to effectively prevent generation of a noise. In the present embodiment, since the mounting board 2 has a substantially square planar shape, the four inertial measurement units 3 are discretely arranged at four corners of the mounting board 2. Thus, it is possible to arrange the four inertial measurement units 3 at a distance as long as possible from each other. It should be noted that the shape of the mounting board 2 and the arrangement of the four inertial units 3 are not particularly limited.

Then, the inertial measurement units 3 will be described. As shown in FIG. 1, the four inertial measurement units 3 includes one inertial measurement unit 3A as a master unit, and three inertial measurement units 3B as subordinate units.

As shown in FIG. 2, the inertial measurement unit 3A has a triaxial angular velocity sensor device 4A as an angular velocity sensor device, a triaxial acceleration sensor device 5A as an acceleration sensor device, a signal processing circuit 6A for processing output signals from these devices 4A, 5A, and an output terminal 66 for outputting a synchronizing clock CLK described later.

The triaxial angular velocity sensor device 4A detects an angular velocity $\omega x$ around the X axis, an angular velocity $\omega y$ around the Y axis, and an angular velocity $\omega z$ around the Z axis independently of each other, and then outputs data $D\omega x$ of the X-axis angular velocity as a digital value, data $D\omega y$ of the Y-axis angular velocity, and data $D\omega z$ of the Z-axis angular velocity.

Further, the triaxial angular velocity sensor device 4A has an X-axis angular velocity sensor 4x for detecting the angular velocity $\omega x$ around the X axis, a Y-axis angular velocity sensor 4y for detecting the angular velocity $\omega y$ around the Y axis, a Z-axis angular velocity sensor 4z for detecting the angular velocity $\omega z$ around the Z axis, and a signal processing circuit 40 which processes detection signals from these sensors 4x, 4y, and 4z to output the data $D\omega x$, $D\omega y$, and $D\omega z$.

Although not shown in the drawings, the signal processing circuit 40 includes, for example, an amplifier circuit for amplifying the detection signals from the respective sensors 4x, 4y, and 4z, an analog circuit including a synchronous detection circuit for synchronously demodulating the detection signals and so on, and an A/D conversion circuit for converting analog signals from the analog circuit into digital signals. The A/D conversion circuit A/D-converts, for example, the analog signal of the X-axis angular velocity, the analog signal of the Y-axis angular velocity, and the analog signal of the Z-axis angular velocity into digital data in a time-sharing manner.

It should be noted that the configuration of the triaxial angular velocity sensor device 4A is not particularly limited. For example, an X-axis angular velocity sensor device which detects the angular velocity ωx around the X axis to output the data Dωx of the X-axis angular velocity, a Y-axis angular velocity sensor device which detects the angular velocity coy around the Y axis to output the data Dωy of the Y-axis angular velocity, and a Z-axis angular velocity sensor device which detects the angular velocity ωz around the Z axis to output the data Dωz of the Z-axis angular velocity can be integrated with each other. Further, it is possible to omit one or two of the detection axes of the X axis, the Y axis, and the Z axis.

The triaxial acceleration sensor device 5A detects acceleration Ax in the X-axis direction, acceleration Ay in the Y-axis direction, and acceleration Az in the Z-axis direction independently of each other, and then outputs data DAx of the X-axis acceleration as a digital value, data DAy of the Y-axis acceleration, and data DAz of the Z-axis acceleration.

Further, the triaxial acceleration sensor device 5A has an X-axis acceleration sensor 5x for detecting the acceleration Ax in the X-axis direction, a Y-axis acceleration sensor 5y for detecting the acceleration Ay in the Y-axis direction, a Z-axis acceleration sensor 5z for detecting the acceleration Az in the Z-axis direction, and a signal processing circuit 50 which processes detection signals from these sensors 5x, 5y, and 5z to output the data DAx, DAy, and DAz.

Although not shown in the drawings, the signal processing circuit 50 includes, for example, an amplifier circuit for amplifying the detection signals from the respective sensors 5x, 5y, and 5z, an analog circuit including a synchronous detection circuit for synchronously demodulating the detection signals and so on, and an A/D conversion circuit for converting analog signals from the analog circuit into digital signals. The A/D conversion circuit A/D-converts, for example, the analog signal of the X-axis acceleration, the analog signal of the Y-axis acceleration, and the analog signal of the Z-axis acceleration into digital data in a time-sharing manner.

It should be noted that the configuration of the triaxial acceleration sensor device 5A is not particularly limited. For example, an X-axis acceleration sensor device which detects the acceleration Ax in the X-axis direction to output the data DAx of the X-axis acceleration, a Y-axis acceleration sensor device which detects the acceleration Ay in the Y-axis direction to output the data DAy of the Y-axis acceleration, and a Z-axis acceleration sensor device which detects the acceleration Az in the Z-axis direction to output the data DAz of the Z-axis acceleration can be integrated with each other. Further, it is possible to omit one or two of the detection axes of the X axis, the Y axis, and the Z axis.

The signal processing circuit 6A is formed of, for example, a computer, and has a processor (CPU) for processing information, a memory coupled to the processor so as to be able to communicate with the processor, and an external interface. Further, the memory stores a program which can be executed by the processor, and the processor retrieves and then executes the program stored in the memory.

As shown in FIG. 3, the signal processing circuit 6A has a signal processing section 60, a host interface 64, and an oscillation circuit 65, wherein the signal processing section 60 processes the data Dωx, Dωy, Dωz, DAx, DAy, and DAz from the triaxial angular velocity sensor device 4A and the triaxial acceleration sensor device 5A, and the host interface 64 transmits data processed by the signal processing section 60 to the host device 9 as an external device, and the oscillation circuit 65 generates the synchronizing clock CLK.

The signal processing section 60 processes, for example, the data Dωx, Dωy, Dωz, DAx, DAy, and DAz in a time-sharing manner. Further, the signal processing section 60 has a first signal processing section 61, a second signal processing section 62, and a third signal processing section 63, wherein the first signal processing section 61 processes the data Dωx, Dωy, Dωz, DAx, DAy, and DAz, the second signal processing section 62 further processes the data processed by the first signal processing section 61, and the third signal processing section 63 further processes the data processed by the second signal processing section 62.

It should be noted that the processing contents performed by the first signal processing section 61, the second signal processing section 62, and the third signal processing section 63 are not particularly limited. In the present embodiment, the first signal processing section 61 is a filtering circuit which removes noises from the data Dωx, Dωy, Dωz, DAx, DAy, and DAz to output data Dωx1, Dωy1, Dωz1, DAx1, DAy1, and DAz1. Further, the second signal processing section 62 is a temperature compensation circuit which performs temperature compensation on the data Dωx1, Dωy1, Dωz1, DAx1, DAy1, and DAz1 to output data Dωx2, Dωy2, Dωz2, DAx2, DAy2, and DAz2. Further, the third signal processing section 63 is a matrix calculation circuit which performs a matrix calculation for coordinate transformation on the data Dωx2, Dωy2, Dωz2, DAx2, DAy2, and DAz2 to output data Dωx3, Dωy3, Dωz3, DAx3, DAy3, and DAz3.

The data Dωx, Dωy, Dωz, DAx, DAy, and DAz can correspond respectively to the sensors of the triaxial angular velocity sensor device 4A and the triaxial acceleration sensor device 5A. The data Dωx1, Dωy1, Dωz1, DAx1, DAy1, and DAz1 can correspond respectively to the sensors of the triaxial angular velocity sensor device 4A and the triaxial acceleration sensor device 5A. The data Dωx2, Dωy2, Dωz2, DAx2, DAy2, and DAz2 can correspond respectively to the sensors of the triaxial angular velocity sensor device 4A and the triaxial acceleration sensor device 5A. The data Dωx3, Dωy3, Dωz3, DAx3, DAy3, and DAz3 can correspond respectively to the sensors of the triaxial angular velocity sensor device 4A and the triaxial acceleration sensor device 5A, and can be, for example, attitude data or positional data obtained by calculation. In other words, the data Dωx3, Dωy3, Dωz3, DAx3, DAy3, and DAz3 can correspond respectively to the data Dωx, Dωy, Dωz, DAx, DAy, and DAz, but are not required to correspond thereto. Here, the data Dωx3, Dωy3, Dωz3, DAx3, DAy3, and DAz3 to be output to the host device 9 in a first signal processing mode M1 can be, for example, attitude data or positional data obtained by calculation.

It should be noted that the configuration of the signal processing section 60 is not particularly limited, and it is possible to omit one or two of the constituents thereof, or to include another signal processing section for executing different processing.

The host interface 64 transmits the data Dωx3, Dωy3, Dωz3, DAx3, DAy3, and DAz3 output from the signal processing section 60 to the host device 9. The host interface 64 is not particularly limited, but is, for example, SPI (Serial Peripheral Interface). It should be noted that this is not a limitation, and it is possible to adopt, for example, an I²C (Inter-Integrated Circuit) interface circuit.

As shown in FIG. 3, the inertial measurement unit 3B as the subordinate unit has a triaxial angular velocity sensor device 4B as the angular velocity sensor device, a triaxial acceleration sensor device 5A as the acceleration sensor device, a signal processing circuit 6B for processing output signals from these devices 4B, 5B, and an input terminal 67 to which the synchronizing clock CLK from the inertial measurement unit 3A is input. The triaxial angular velocity sensor device 4B is substantially the same in configuration as the triaxial angular velocity sensor device 4A, and the triaxial acceleration sensor device 5B is substantially the same in configuration as the triaxial acceleration sensor device 5A.

In contrast, as shown in FIG. 3, the signal processing circuit 6B has the signal processing section 60 and the host interface 64, wherein the signal processing section 60 processes the data Dωx, Dωy, Dωz, DAx, DAy, and DAz from the triaxial angular velocity sensor device 4B and the triaxial acceleration sensor device 5B, and the host interface 64 transmits data processed by the signal processing section 60 to the host device 9 as an external device. The signal processing section 60 and the host interface 64 are substantially the same in configuration as those provided to the inertial measurement unit 3A.

As described above, by providing the output terminal 66 to the inertial measurement unit 3A, and providing the input terminal 67 to each of the inertial measurement units 3B, it is possible to easily synchronize the four inertial measurement units 3 with each other. Further, according to such a method, since it is possible to omit the oscillation circuit 65 from each of the inertial measurement units 3B, it is possible to achieve simplification of the inertial measurement units 3B.

It should be noted that the triaxial angular velocity sensor devices 4A, 4B are hereinafter collectively referred to as "triaxial angular velocity sensor devices 4" when these devices are not discriminated from each other, the triaxial acceleration sensor devices 5A, 5B are hereinafter collectively referred to as "triaxial acceleration sensor devices 5" when these devices are not discriminated from each other, and the signal processing circuits 6A, 6B are hereinafter collectively referred to as "signal processing circuits 6" when these circuits are not discriminated from each other.

As shown in FIG. 3, the synchronizing clock CLK generated by the oscillation circuit 65 in the inertial measurement unit 3A is input to each of the triaxial angular velocity sensor devices 4 and the triaxial acceleration sensor devices 5 in each of the inertial measurement units 3. In other words, the four inertial measurement units 3 are synchronized with each other by the synchronizing clock CLK.

Further, the inertial measurement units 3 each sample the data Dωx, Dωy, Dωz, DAx, DAy, and DAz at the same timing based on the synchronizing clock CLK. In other words, the four inertial measurement units 3 sample the data Dωx at the same time point, sample the data Dωy at the same time point, sample the data Dωz at the same time point, sample the data DAx at the same time point, sample the data DAy at the same time point, and sample the data DAz at the same time point. Thus, a shift in the sampling time substantially vanishes, and therefore, it is possible to more accurately detect each of the angular velocities ωx, ωy, and ωz, and the accelerations Ax, Ay, and Az.

Any devices can be used as the host device 9, and there can be cited a control device for controlling a variety of types of electronic equipment such as an industrial robot, a car, or an airplane. Such a host device 9 is formed of, for example, a computer, and has a processor (CPU) for processing information, a memory coupled to the processor so as to be able to communicate with the processor, and an external interface. Further, the memory stores a program which can be executed by the processor, and the processor retrieves and then executes the program stored in the memory.

The host interface 9 receives the data Dωx3, Dωy3, Dωz3, DAx3, DAy3, and DAz3 from each of the inertial measurement units 3. Then, the host device 9 calculates the angular velocities ωx, ωy, and ωz, and the accelerations Ax, Ay, and Az from the data Dωx3, Dωy3, Dωz3, DAx3, DAy3, and DAz3 thus received.

Specifically, the host device 9 calculates an average value of the four data Dωx3, which are output from the respective inertial measurement units 3, and are sampled at the same time point, as the angular velocity ωx at that time point, calculates an average value of the four data Dωy3, which are output from the respective inertial measurement units 3, and are sampled at the same time point, as the angular velocity ωy at that time point, and calculates an average value of the four data Dωz3, which are output from the respective inertial measurement units 3, and are sampled at the same time point, as the angular velocity ωz at that time point.

Similarly, the host device 9 calculates an average value of the four data DAx3, which are output from the respective inertial measurement units 3, and are sampled at the same time point, as the acceleration Ax at that time point, calculates an average value of the four data DAy3, which are output from the respective inertial measurement units 3, and are sampled at the same time point, as the acceleration Ay at that time point, and calculates an average value of the four data DAz3, which are output from the respective inertial measurement units 3, and are sampled at the same time point, as the acceleration Az at that time point.

Here, it is known that when averaging the detection results in the respective inertial measurement units 3, the noise component included in the signal is reduced to $1/n^{1/2}$ defining the number of the inertial measurement units 3 as n. Specifically, in the present embodiment, since n=4 is assumed, it is possible to reduce the noise component up to ½. Therefore, it is possible to more accurately detect the angular velocities ωx, ωy, and ωz, and the accelerations Ax, Ay, and Az.

The measurement system 10 is hereinabove described. The sensor module 1 included in such a measurement system 10 has the plurality of inertial measurement units 3 each having the triaxial angular velocity sensor device 4 as the angular velocity sensor device, the triaxial acceleration sensor device 5 as the acceleration sensor device, and the signal processing circuit 6 for processing the output signals from the triaxial angular velocity sensor device 4 and the triaxial acceleration sensor device 5, and the oscillation circuit 65 for generating the synchronizing clock CLK for synchronizing the plurality of inertial measurement units 3 with each other. According to such a configuration, since the plurality of inertial measurement units 3 are synchronized with each other by the synchronizing clock CLK, it is possible for the plurality of inertial measurement units 3 to sample the angular velocities and the accelerations at the same time points. In other words, since a shift in sampling time between the inertial measurement units 3 substantially vanishes, it is possible to more accurately detect each of the angular velocities and the accelerations.

Further, as described above, the oscillation circuit 65 is provided to one of the inertial measurement units 3. In the present embodiment, the oscillation circuit 65 is provided to the inertial measurement unit 3A as the master unit. Thus, it is possible to omit the oscillation circuit 65 from the other inertial measurement units 3B, and therefore, it is possible to achieve simplification of the inertial measurement units 3B.

Further, as described above, the inertial measurement unit 3A, which is one of the inertial measurement units 3, and outputs the synchronizing clock CLK from the oscillation circuit 65, has the output terminal for outputting the synchronizing clock CLK, and the inertial measurement units 3B, which are the other of the inertial measurement units 3, and to which the synchronizing clock CLK is input, have the input terminals 67 to which the synchronizing clock CLK is input. Thus, it is possible to easily synchronize the inertial measurement units 3A, 3B with each other.

Further, as described above, the sensor module 1 has the mounting board 2 on which the plurality of inertial measurement units 3 are mounted. Further, the plurality of inertial measurement units 3 are arranged on the mounting board 2 at a distance from each other. Thus, it is possible to suppress the interference between the inertial measurement units 3, and thus, it is possible to effectively prevent generation of a noise.

Further, as described above, the measurement system 10 has the sensor module 1, and the host device 9 electrically coupled to the sensor module 1. Thus, it is possible for the measurement system 10 to appreciate the advantages of the sensor module 1, and exert a high reliability.

Further, as described above, in the measurement system 10, the output signals from the plurality of inertial measurement units 3 are averaged to thereby obtain the angular velocities $\omega x$, $\omega y$, and $\omega z$, and the accelerations Ax, Ay, and Az. Thus, it is possible to effectively reduce the noise component, and thus, it is possible to more accurately obtain the angular velocities and the accelerations.

Second Embodiment

Figure 4:
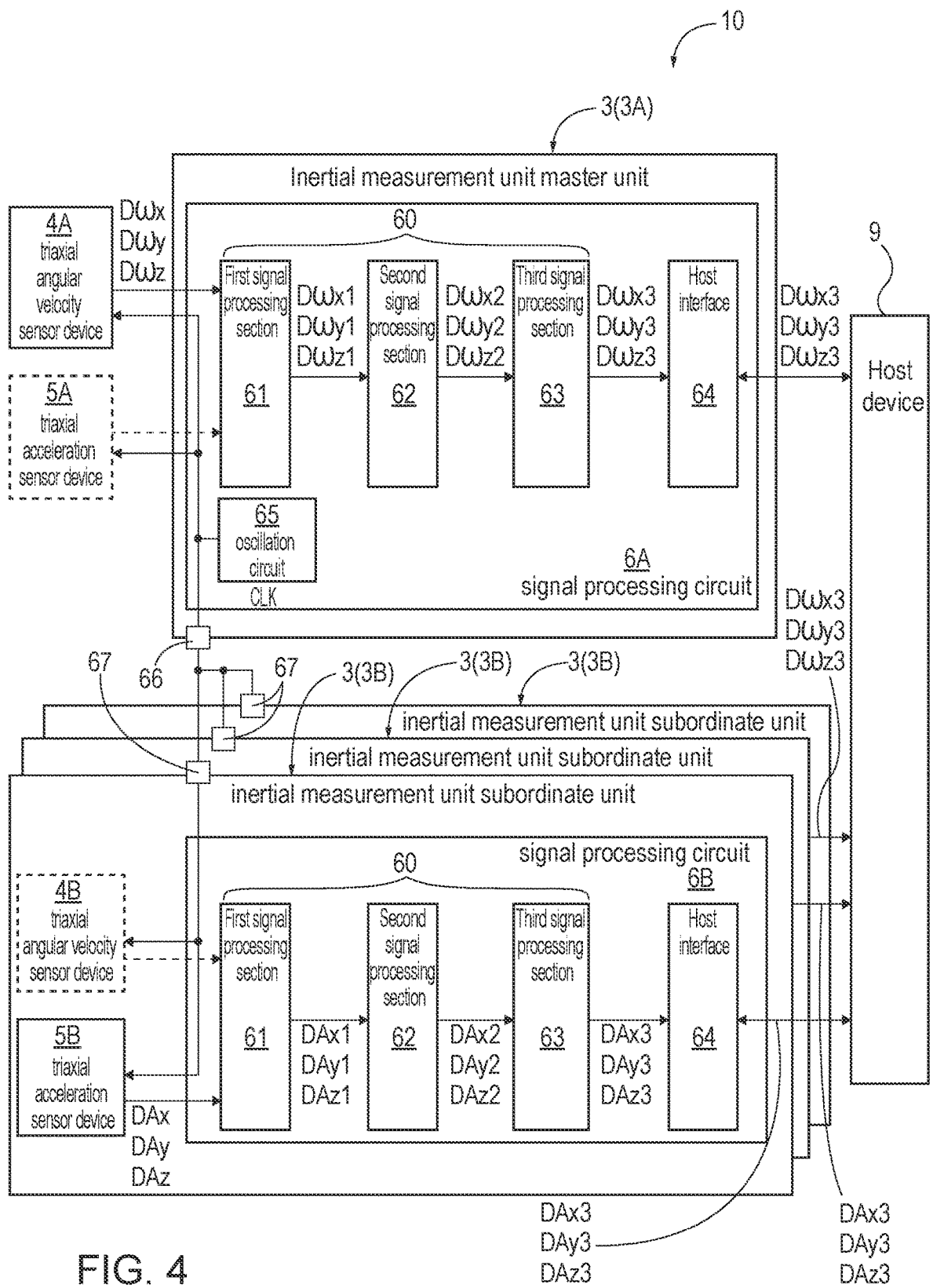
FIG. 4 is a block diagram showing an overall configuration of a measurement system according to a second embodiment.

FIG. 4 is a block diagram showing an overall configuration of a measurement system according to a second embodiment.

The measurement system 10 according to the present embodiment is substantially the same as the measurement system 10 according to the first embodiment described above except the point that the contents of the signal processing in the signal processing circuits 6 are different. It should be noted that in the following description, the present embodiment will be described with a focus on the difference from the embodiment described above, and the description of substantially the same issues will be omitted. Further, in FIG. 4, the constituents substantially the same as those in the embodiment described above are denoted by the same reference symbols.

As shown in FIG. 4, in the measurement system 10 according to the present embodiment, the angular velocities $\omega x$, $\omega y$, and $\omega z$, are detected by two of the four inertial measurement units 3, and the accelerations Ax, Ay, and Az are detected by the rest two of the inertial measurement units 3. Specifically, in the two inertial measurement units 3, only the data $D\omega x$, $D\omega y$, and $D\omega z$ from the triaxial angular velocity sensor device 4 are processed by the signal processing circuit 6, and the data $D\omega x3$, $D\omega y3$, and $D\omega z3$ are transmitted to the host device 9. Meanwhile, in the rest two inertial measurement units 3, only the data DAx, DAy, and DAz from the triaxial acceleration sensor device 5 are processed by the signal processing circuit 6, and the data DAx3, DAy3, and DAz3 are transmitted to the host device 9.

The host device 9 calculates an average value of the two data $D\omega x3$, which are output from the two inertial measurement units 3, and are sampled at the same time point, as the angular velocity $\omega x$ at that time point, calculates an average value of the two data $D\omega y3$ as the angular velocity $\omega y$ at that time point, and calculates an average value of the two data $D\omega z3$ as the angular velocity $\omega z$ at that time point. Similarly, the host device 9 calculates an average value of the two data DAx3, which are output from the rest two inertial measurement units 3, and are sampled at the same time point, as the acceleration Ax at that time point, calculates an average value of the two data DAy3 as the acceleration Ay at that time point, and calculates an average value of the two data DAz3 as the acceleration Az at that time point.

According to such a configuration, although the noise reduction effect becomes lower than in the first embodiment, since the number of signals to be processed by each of the inertial measurement units 3 is halved to three from six in the first embodiment described above, it is possible to shorten the sampling period of the data $D\omega x$, $D\omega y$, $D\omega z$, DAx, DAy, and DAz by half. Therefore, it is possible to suppress the quantization error caused by the A/D conversion to a lower level, and the detection accuracy of the angular velocities $\omega x$, $\omega y$, and $\omega z$, and the accelerations Ax, Ay, and Az is improved.

The measurement system 10 according to the present embodiment is hereinabove described. In the sensor module included in such a measurement system 10, there are included the inertial measurement unit 3 which processes only the output signals from one of the triaxial angular velocity sensor device 4 and the triaxial acceleration sensor device 5, and the inertial measurement unit 3 which processes only the output signals from the other thereof. Thus, it is possible to shorten the sampling period of the angular velocity and the acceleration, and therefore, it is possible to suppress the quantization error caused by the A/D conversion to a lower level, and the detection accuracy of the angular velocities $\omega x$, $\omega y$, and $\omega z$, and the accelerations Ax, Ay, and Az is improved.

According also to such a second embodiment as described above, there can be exerted substantially the same advantages as in the first embodiment described above.

Third Embodiment

Figure 5:
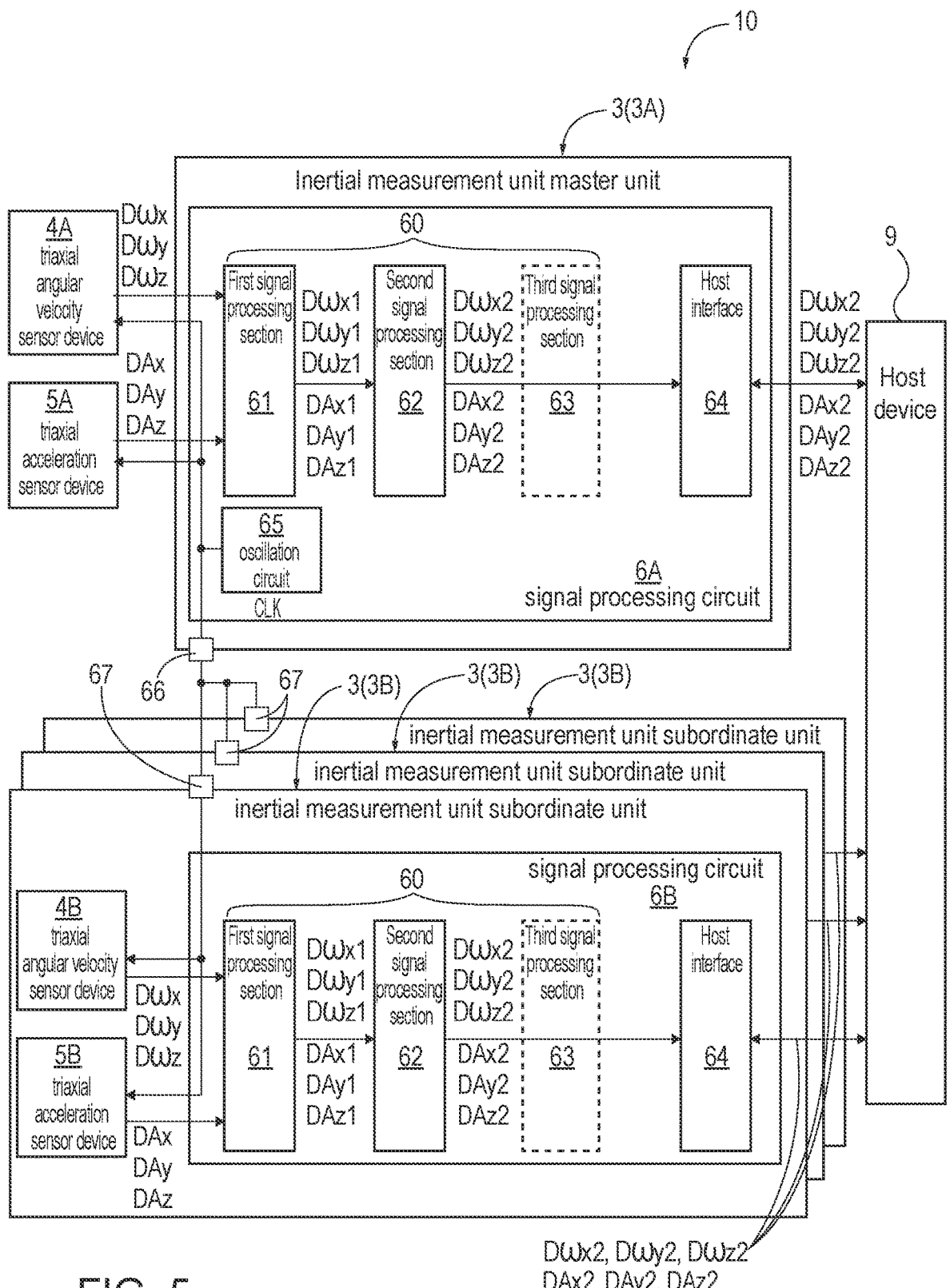
FIG. 5 is a block diagram showing an overall configuration of a measurement system according to a third embodiment.

FIG. 5 is a block diagram showing an overall configuration of a measurement system according to a third embodiment.

The measurement system 10 according to the present embodiment is substantially the same as the measurement system 10 according to the first embodiment described above except the point that the contents of the signal processing in the signal processing circuits 6 are different. It should be noted that in the following description, the present embodiment will be described with a focus on the difference from the embodiment described above, and the description of substantially the same issues will be omitted. Further, in FIG. 5, the constituents substantially the same as those in the embodiment described above are denoted by the same reference symbols.

As shown in FIG. 5, in the measurement system 10 according to the present embodiment, the signal processing in the third signal processing section 63 is omitted in each of the inertial measurement units 3. In other words, the data Dωx2, Dωy2, Dωz2, DAx2, DAy2, and DAz2 are output from each of the inertial measurement units 3. By omitting the signal processing in the third signal processing section 63 as described above, the processing time necessary from when the signal processing circuit 6 obtains the data Dωx, Dωy, Dωz, DAx, DAy, and DAz to when the signals having been processed are output to the host device 9 can be made shorter than in the first embodiment described above. Therefore, it is possible to shorten the sampling period of the data Dωx, Dωy, Dωz, DAx, DAy, and DAz, and thus, it is possible to suppress the quantization error to a lower level. It should be noted that which signal processing is omitted can arbitrarily be changed in accordance with, for example, the sampling period and the contents of the signal processing required by the host device 9.

Further, the data Dωx2, Dωy2, Dωz2, DAx2, DAy2, and DAz2 to be output to the host device 9 can correspond respectively to the data Dωx, Dωy, Dωz, DAx, DAy, and DAz output by the triaxial angular velocity sensor device 2 and the triaxial acceleration sensor device 3.

Fourth Embodiment

Figure 6:
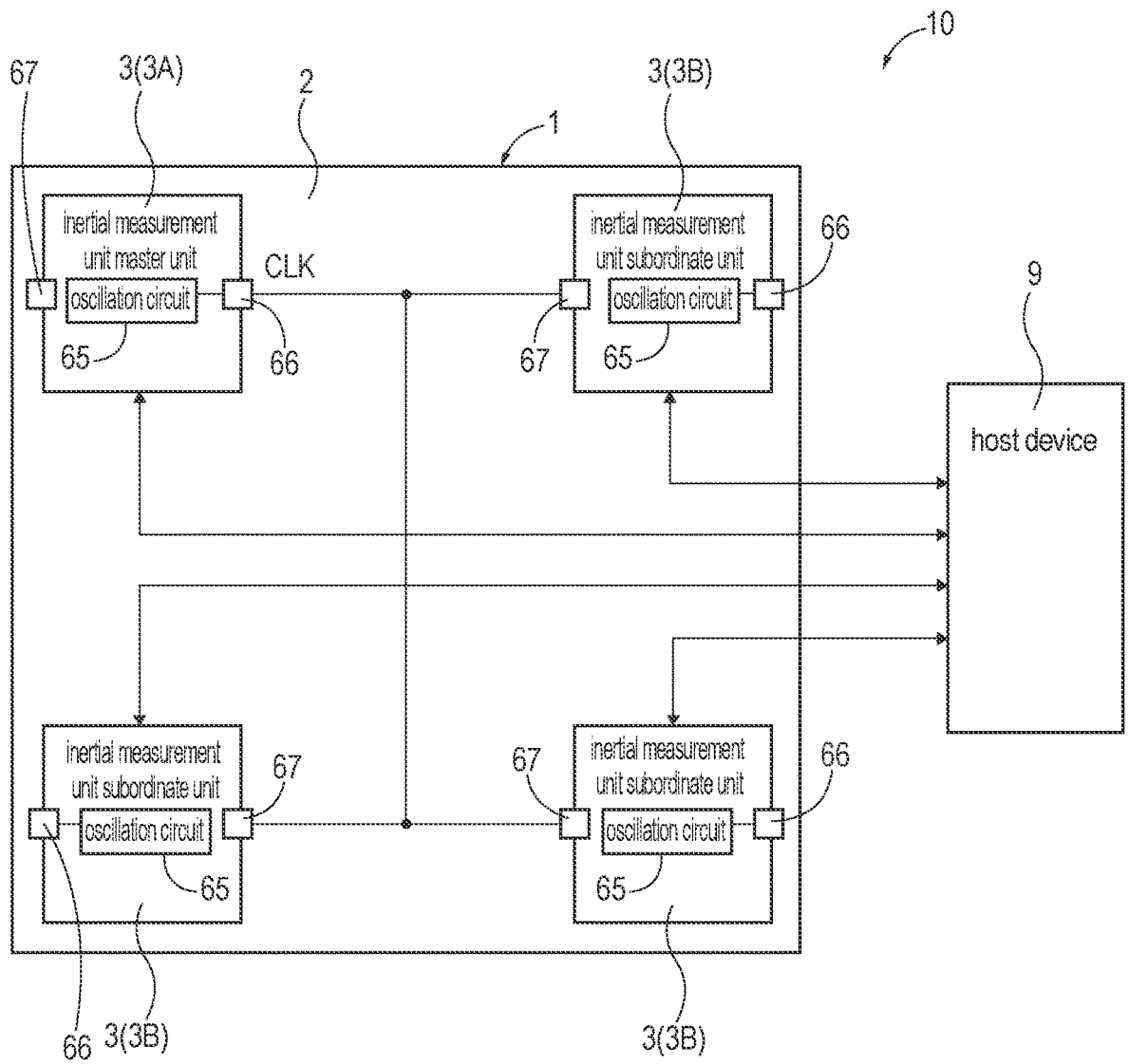
FIG. 6 is a block diagram showing an overall configuration of a measurement system according to a fourth embodiment.

FIG. 6 is a block diagram showing an overall configuration of a measurement system according to a fourth embodiment.

The measurement system 10 according to the present embodiment is substantially the same as the measurement system 10 according to the first embodiment described above except the point that the internal measurement unit 3A as the master unit and the inertial measurement unit 3B as the subordinate unit can be exchanged. It should be noted that in the following description, the present embodiment will be described with a focus on the difference from the embodiment described above, and the description of substantially the same issues will be omitted. Further, in FIG. 6, the constituents substantially the same as those in the embodiment described above are denoted by the same reference symbols.

As shown in FIG. 6, in the measurement system 10 according to the present embodiment, all of the four inertial measurement units 3 are the same in configuration as each other, and each have the oscillation circuit 65, the output terminal 66, and the input terminal 67. By making the four inertial measurement units 3 substantially the same in configuration as each other, the configuration of the measurement system 10 becomes simple.

In the measurement system 10 having such a configuration, one of the inertial measurement units 3 functions as the inertial measurement unit 3A as the master unit, and the other three of the inertial measurement units function as the inertial measurement units 3B as the subordinate units. Specifically, the single inertial measurement unit 3A as the master unit generates the synchronizing clock CLK in the oscillation circuit 65 and then outputs the synchronizing clock CLK from the output terminal 66, and the three inertial measurement units 3B as the subordinate units each receive the synchronizing clock CLK from the inertial measurement unit 3A as the master unit via the input terminal 67 to thereby be synchronized with the inertial measurement unit 3A as the master unit.

Further, in the measurement system 10, the inertial measurement unit 3A as the master unit is exchangeable, and it is possible to select one of the four inertial measurement units 3 as the master unit, and the other three of the four inertial measurement units 3 as the subordinate units. In the illustrated configuration, the inertial measurement unit 3 located upper left is assumed as the master unit, but it is possible to set the inertial measurement unit 3 located upper right as the master unit by, for example, coupling the output terminal 66 of the inertial measurement unit 3 located upper right to the input terminals 67 of the other three of the inertial measurement units. As described above, by making the master unit and the subordinate units selectable in the four inertial measurement units 3, the degree of freedom and the convenience of the measurement system 10 are enhanced.

As described above, in the measurement system 10 according to the present embodiment, it is possible to exchange the inertial measurement unit 3A which outputs the synchronizing clock CLK and the inertial measurement unit 3B to which the synchronizing clock CLK is input. The degree of freedom and the convenience of the measurement system 10 are enhanced.

Although the sensor module and the measurement system according to the present disclosure are described based on the illustrated embodiments, the present disclosure is not limited to these embodiments, but the constituents can be replaced with those having substantially the same functions and arbitrary configurations. Further, the present disclosure can also be added with any other constituents. Further, it is also possible to arbitrarily combine any of the embodiments described above with each other.

For example, in the embodiments described above, the signal processing section 60 has the first signal processing section 61, the second signal processing section 62, and the third signal processing section 63, but this is not a limitation, and it is possible to omit one of these signal processing sections. Further, it is possible to further include at least one additional signal processing section.

What is claimed is:

1. A sensor module comprising:
   a plurality of inertial measurement units, each of the plurality of inertial measurement units having an angular velocity sensor device, an acceleration sensor device, and a signal processing circuit configured to process an output signal from the angular velocity sensor device and the acceleration sensor device;
   an oscillation circuit configured to generate a synchronizing clock which synchronizes the plurality of inertial measurement units; and
   a mounting board on which the plurality of inertial measurement units are mounted, the mounting board being a planar member having a planar surface on which the plurality of inertial measurement units are mounted, and the plurality of inertial measurement units are arranged on the planar surface of the mounting board at a distance from each other, each of the plurality of inertial measurement units being mounted at a respective corner of the mounting board such that the signal processing circuit of each of the plurality of inertial measurement units are also arranged at the respective corner,
   wherein the signal processing circuit of each of the plurality of inertial measurement units includes a processor, the angular velocity sensor device of each of the plurality of inertial measurement units includes a first analog-to-digital conversion circuit, and the acceleration sensor device of each of the plurality of inertial measurement units includes a second analog-to-digital conversion circuit, the signal processing circuit of at least one of the plurality of inertial measurement units is configured to process the output signal from only one of the angular velocity sensor device and the acceleration sensor device, such that the signal processing circuit of the at least one of the plurality of inertial measurement units is configured to modify data associated with the output signal prior to output of the data from the at least one of the plurality of inertial measurement units, and the signal processing circuit of at least another one of the plurality of inertial measurement units, which is different than the at least one of the plurality of inertial measurement units, is configured to process the output signal from only another one of the angular velocity sensor device and the acceleration sensor device, such that the signal processing circuit of the at least another one of the plurality of inertial measurement units is configured to modify data associated with the output signal prior to output of the data from the at least another one of the plurality of inertial measurement units.

2. The sensor module according to claim 1, wherein the signal processing circuit of one inertial measurement unit of the plurality of inertial measurement units includes the oscillation circuit.

3. The sensor module according to claim 2, wherein the one inertial measurement unit in which the oscillation circuit is provided outputs the synchronizing clock from the oscillation circuit via an output terminal configured to output the synchronizing clock, and another inertial measurement unit of the plurality of inertial measurement units in which the oscillation circuit is not provided and to which the synchronizing clock is input has an input terminal to which the synchronizing clock is input.

4. The sensor module according to claim 3, wherein the one inertial measurement unit in which the oscillation circuit is provided and which is configured to output the synchronizing clock and the another inertial measurement unit in which the oscillation circuit is not provided and to which the synchronizing clock is input are exchangeable among the plurality of inertial measurement units.

5. A measurement system comprising:
the sensor module according to claim 1; and
a host device electrically coupled to the sensor module.

6. The measurement system according to claim 5, wherein output signals from the plurality of inertial measurement units are averaged to thereby obtain an angular velocity and an acceleration.

7. The sensor module according to claim 1, wherein the planar surface of the mounting board has a substantially square shape.

* * * * *